US008255388B1

(12) United States Patent
Luo et al.

(10) Patent No.: US 8,255,388 B1
(45) Date of Patent: Aug. 28, 2012

(54) PROVIDING A PROGRESS INDICATOR IN A DATABASE SYSTEM

(75) Inventors: Gang Luo, Madison, WI (US); Jeffrey F. Naughton, Madison, WI (US); Curt J. Ellmann, Madison, WI (US); Michael W. Watzke, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 1693 days.

(21) Appl. No.: 10/837,414

(22) Filed: Apr. 30, 2004

(51) Int. Cl.
*G06F 7/00* (2006.01)
(52) U.S. Cl. .................................................. 707/719
(58) Field of Classification Search ............... 707/3, 719
See application file for complete search history.

(56) References Cited

U.S. PATENT DOCUMENTS

| 6,038,588 | A  | * | 3/2000  | Nagarajayya et al. | ........ | 718/102 |
| 6,618,731 | B2 | * | 9/2003  | Eigel-Danielson    | ........... | 707/102 |
| 2002/0143850 | A1 | * | 10/2002 | Caronni et al.     | ............... | 709/201 |
| 2003/0163478 | A1 | * | 8/2003  | Kirkland           | ...................... | 707/102 |
| 2005/0222965 | A1 | * | 10/2005 | Chaudhuri et al.   | ............... | 707/1 |

OTHER PUBLICATIONS

Kabra et al., "Efficient Mid-Query Re-Optimization of Sub-Optimal Query Execution Plans," SIGMOD Conference, pp. 106-117 (1998).
Brad A. Myers, "the Importance of Percent-Done Progress Indicators for Computer-Human Interfaces," 1985 ACM, pp. 11-17 (1985).
Llyas et al., "Estimating Compilation Time of a Query Optimizer," SIGMOD Conference, pp. 373-384 (Jun. 2003).
Software Product Research, "SQL Monitoring Facility," 4 pages, printed from http://www.sprdb2.com/SQLMFVSE.PDF (2000).
Mike Dempsey, "Monitoring Active Queries with Teradata Manager 5.0," NCR Corporation, pp. 1-8 (Jul. 2001).
Ask Uncle Larry, "Monitoring Rollback Progress," pp. 1-3, printed from http://www.interealm.com/technotes/larry/rollback_time.html, at least as early as Sep. 2003.
Oracle, "Communication with Oracle during long-running query," 2 pages, printed from http://www.experts-exchange.com/Databases/Oracle/Q_2067511.html, (Jul. 2003).
Berque et al., "Monitoring an Algorithm's Execution," Computational Support for Discrete Mathematics, DIMACS, pp. 1-11 (1992).
Hellerstein et al., "Online Aggregation," pp. 1-12, (May 1997).

* cited by examiner

*Primary Examiner* — Cheyne Ly
(74) *Attorney, Agent, or Firm* — Trop, Pruner & Hu P.C.

(57) ABSTRACT

A database system is capable of processing a query and providing a progress indicator of the processing of the query based on at least a first cost factor. Initially, an estimate is set for the first cost factor. During processing of the query, the estimate of the first cost factor is updated to enable refinement of the progress indicator.

25 Claims, 3 Drawing Sheets

PROVIDING A PROGRESS INDICATOR IN A DATABASE SYSTEM

BACKGROUND

A relational database is a collection of logically related data that includes tables (or relations) made up of rows (or tuples) and columns (or attributes). Each row represents an occurrence of an entity defined by a table, with an entity being a person, place, or thing about which the table contains information. To extract data from, or to update, a relational table, queries according to a standard database query language (e.g., Structured Query Language or SQL) are used.

Queries submitted to a database system are parsed by a parser, which generates a query plan submitted to one or more processing units in the database system to perform reading, updating, or deleting of data in one or more tables specified by each query. In database systems having tables that contain large amounts of data, complex queries can take a relatively long time (e.g., hours or days) to execute.

Some database systems provide simple progress indicators to provide feedback to users regarding the progress of the execution of queries. One type of progress indicator is based on an estimate of query running time provided by the optimizer. Although generating a progress indicator based upon the optimizer's estimate of query running time is relatively simple, the optimizer's estimate may not always be accurate. The inaccuracy stems from the fact that the optimizer's query cost estimates usually contain errors, and that a particular system loading (such as low or no system loading) is assumed. In an actual database system, a heavy loading may be present, which renders some query cost estimates inaccurate.

Thus, conventional database systems have not generally provided adequate progress indicators.

SUMMARY

In general, methods and apparatus are provided for accurate progress indicators in database systems. For example, a method for use in a database system includes processing a database query in the database system, and providing a progress indicator of the processing of the database query based on at least a first factor. An estimate for the first factor is initially set. During processing of the database query, the estimate of the first factor is updated to enable refinement of the progress indicator.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments of the invention, a progress indicator mechanism in a database system provides a relatively accurate progress indicator of the progress of execution of a query plan in the database system. The progress indicator mechanism divides a query plan for a given query into pipelined segments, where the boundaries of the segments are defined by blocking operators. Query progress is measured in terms of the percentage of input data processed by each of these segments. Initially, the progress indicator presented by an progress indicator mechanism is based on estimates provided by the optimizer for cardinalities (number of rows in each table involved in processing a query) and sizes (size of each such table) of inputs to the segments of the query plan. The inputs to the segments are base tables, tables containing intermediate results, and so forth.

As a query runs, the progress indicator mechanism obtains more precise information about inputs to the segments in the query plan. Also, the progress indicator mechanism monitors the speed at which segments are processing their inputs, which is a function of the query plan and system load at run-time. As updated information about inputs to the segments and updated running speeds are received, the updated information is used by the progress indicator mechanism to refine the estimated query execution time and to update the presented progress indicator.

Figure 1:
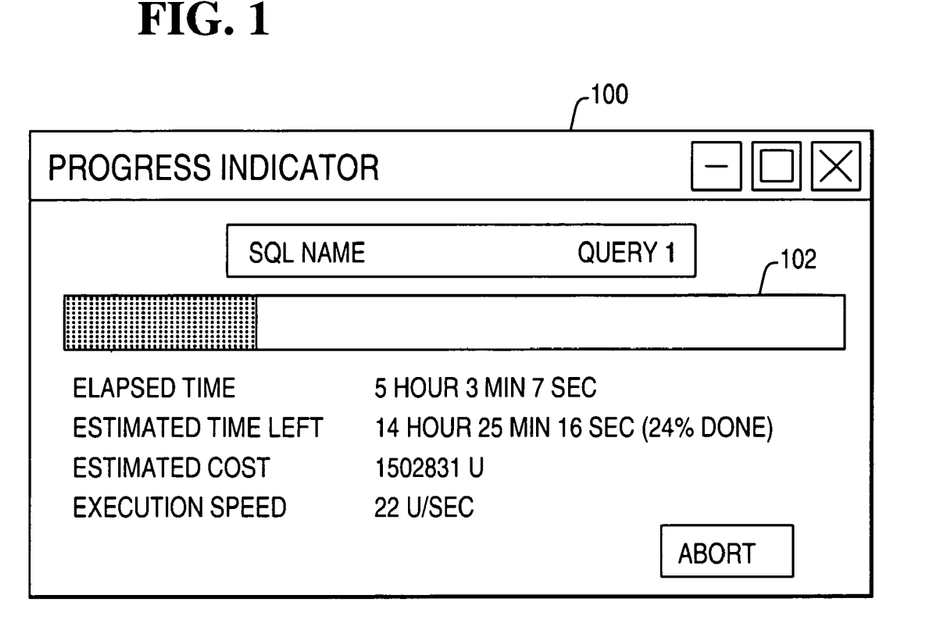
FIG. 1 illustrates a progress indicator presented by a progress indicator mechanism according to some embodiments.

FIG. 1 shows an example progress indicator that is displayed by the progress indicator mechanism of a database system. The progress indicator includes a graphical user interface (GUI) screen 100 (displayable on a display) that includes a bar 102 to indicate the amount of work that has been performed and the amount of work yet to be performed for a query (referred to as "Query 1" in the display). The text in the progress indicator screen 100 indicates that the elapsed time is 5 hours, 3 minutes, and 7 seconds, and that the estimated time left is 14 hours, 25 minutes, and 16 seconds. A percentage indicator is provided to indicate the percentage that has been completed (in this example 24%). The estimated cost of the query plan is 1,502,831 units (U), where U is a predefined measure of the cost of processing a query. U is an abstract quantity that represents one unit of work. The execution speed is indicated as being 22 U/sec (units per second).

The progress indicator provided by the progress indicator mechanism continually revises the displayed progress indicator, based on changes in the estimates of table cardinalities and sizes and changes in the rate at which the query is progressing. The progress indicator mechanism is updated relatively frequently so that a user sees a smooth display. However, the update rate is set so as to be not so frequent as to over burden either the user interface or the processing unit(s) in the database system. The progress indicator mechanism is relatively efficient so that it has a relatively small effect on the efficiency of query execution.

Figure 2:
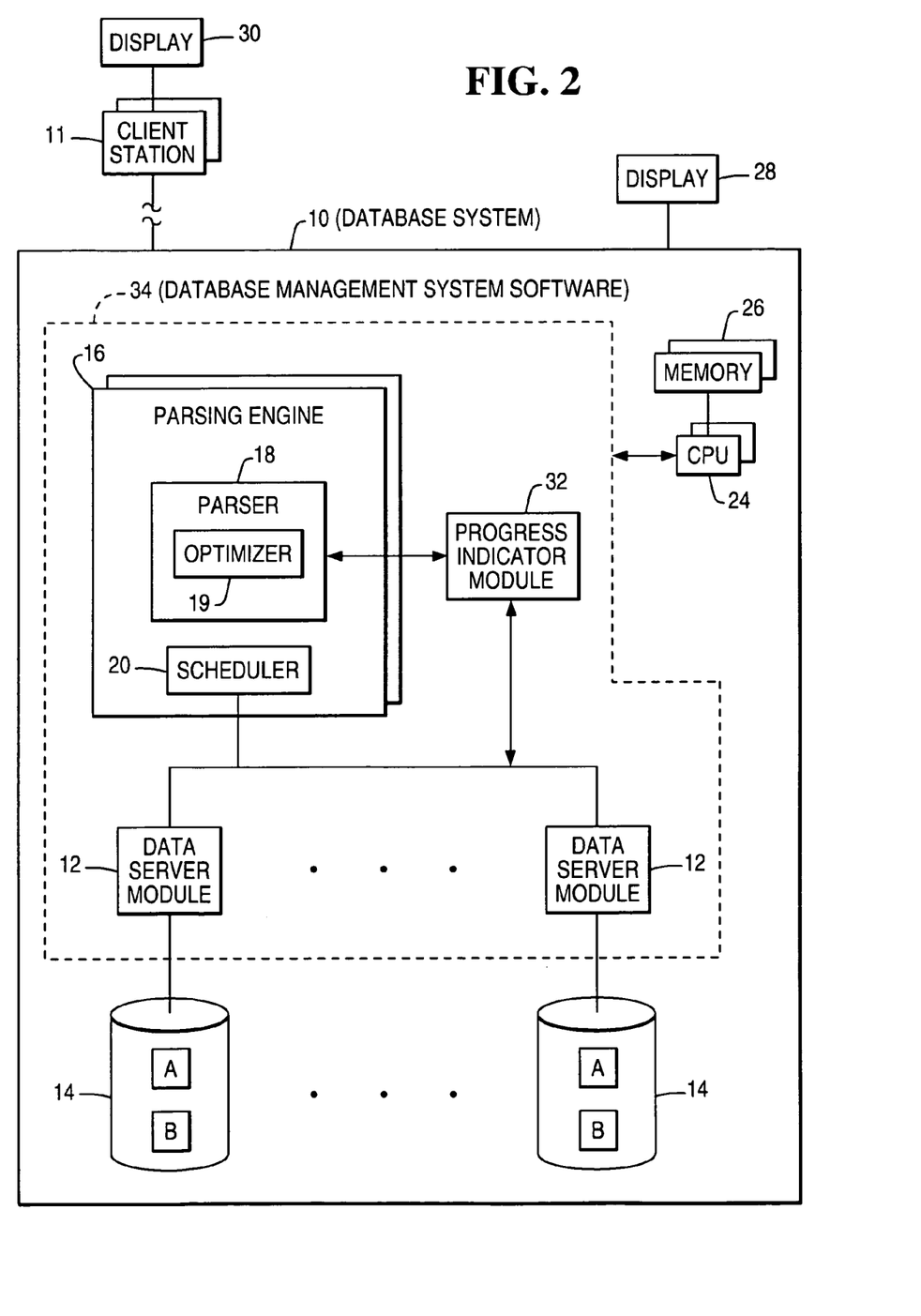
FIG. 2 is a block diagram of an example arrangement including a database system coupled to one or more client stations, the database system incorporating the progress indicator mechanism according to an embodiment.

In one example implementation, the query progress indicator mechanism is included in a database system 10 depicted in FIG. 2. In the example of FIG. 2, the progress indicator mechanism includes a progress indicator module 32, which is a software module. The database system 10 is a parallel database system having a plurality of data server modules 12. Each data server module 12 is responsible for managing the access to or modification of data stored in a respective one of plural storage modules 14. As depicted in FIG. 2, each of base tables A and B are distributed across plural storage modules 14. The multiple data server modules 12 can perform operations in parallel such that concurrent access of data can be performed (such as access of data in the tables A, B distributed across storage modules 14).

Examples of responsibilities of each data server module (also referred to as an "access module") include locking databases, tables, or portions of tables; creating, modifying, or deleting definitions of tables; inserting, deleting, or modifying rows within tables; and retrieving information from definitions and tables. In one example implementation, the data server modules 12 are based on access modules processors (AMPs) in TERADATA® database systems from NCR Corporation.

A requesting client, such as a software application in the database system 10 or a client station 11 coupled over a data network, sends requests to the database system 10. Received requests are processed by one or more parsing engines 16. The requests are in the form of queries, such as queries according to a standard database query language (e.g., Structured Query Language or SQL, as provided by the American National Standards Institute or ANSI). In other embodiments, other types of database query languages are used.

Each parsing engine 16 includes a parser 18 and a scheduler 20. The parser 18 checks a received request for proper syntax and semantically evaluates the request. The parser 18 also includes an optimizer 19 that develops query plans for the received requests. Based on calculated relative costs of the query plans, the optimizer 19 selects a least cost query plan. Each query plan includes a sequence of executable steps that are communicated by the scheduler 20 in the parsing engine 16 to one or more of the data server modules 12 for execution. Collectively, the one or more parsing engines 16, data server modules 12, and progress indicator module 32 are part of a database management system software 34.

In some implementations, a display 28 is coupled to the database system 10 for displaying the progress indicator screen 100 (FIG. 1). Alternatively, the progress indicator screen 100 is displayed in a display 30 coupled to a client station 11.

The progress indicator is provided by the progress indicator module 32 in the database system 10. The progress indicator module 32 along with other software modules (such as the parsing engine 16 and data server modules 12) are executable on one or more central processing units (CPUs) 24, which are coupled to one or more memories 26. The progress indicator module 32 communicates with the optimizer 19 to receive initial cost estimates (e.g., table cardinalities, sizes, number of input/output or I/O cycles needed for various parts of a query plan) from the optimizer 19. The parser indicator module 32 also communicates with the data server modules 12 to obtain updated information regarding table cardinalities and sizes, and other system run-time characteristics (e.g., amount of available memory).

Based on the updated information, the progress indicator module 32 is able to refine the information displayed in the progress indicator screen 100. At any time, the remaining query execution time is estimated to be the ratio of the estimated remaining query cost to the observed current query execution speed.

In the following discussion, select-project-join queries are considered, where join algorithms can be one of a hash join, nested loops join, and sort-merge join. A select-project-join query is a query that involves selection of columns (or attributes) from tables (or relations) to be projected as outputs of a join operation. Base tables can be accessed by either table scans or index scans. However, note that the techniques described below can be applied to other types of queries.

Figure 3:
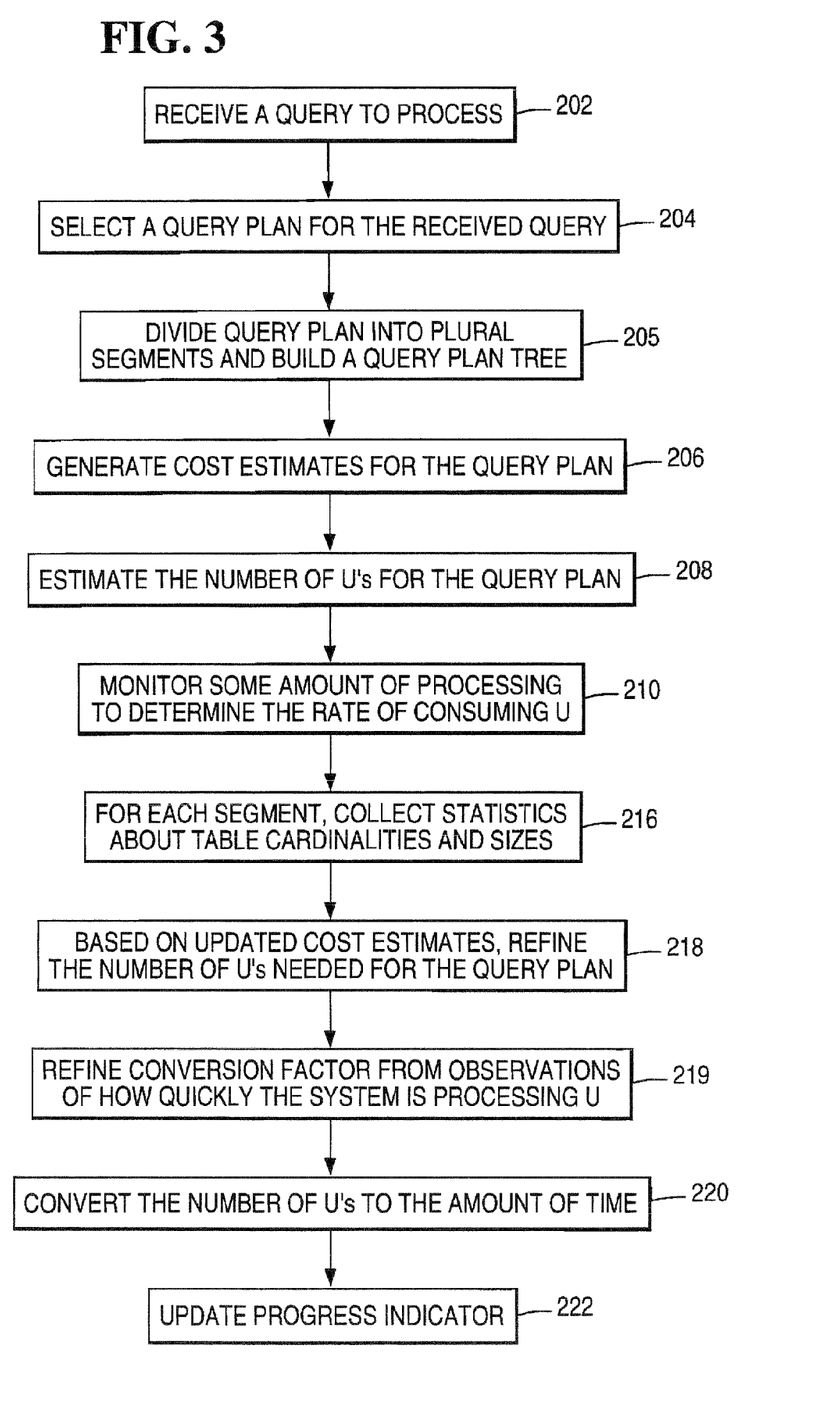
FIG. 3 is a flow diagram of a process of generating a progress indicator, according to an embodiment of the invention.

As shown in FIG. 3, the parsing engine 16 receives (at 202) a query Q to be processed by the database system. For the query Q, the optimizer 19 selects (at 204) a query plan. To accurately generate and refine the progress indicator, the progress indicator module 32 divides (205) the query plan into plural segments, as described in greater detail further below. A query plan tree that includes the segments is built. Refinement of costs and processing speed is performed for each segment. Updated cost information for each segment is propagated from lower level segments to higher level segments to further refine the progress indicator.

Also, for the selected query plan, the optimizer 19 generates (at 206) cost estimates for the query plan (such as number of I/O cycles needed for various parts of the query plan, cardinality and size estimates for tables, e.g., base tables and intermediate or result tables). In accordance with some embodiments of the invention, the progress indicator module 32 measures both the estimated query cost and the query execution speed by using an abstract unit U (also referred to as a "cost factor"). The abstract unit U can be any arbitrarily defined measure that provides some indication of the query cost and query execution speed. The requirements for U are that the progress indicator module 32 can readily estimate how many U's a query plan will take to execute, and that the progress indicator module 32 can readily convert from U's to estimated time, since time is likely to be the unit most meaningful to users. Candidates for U include I/O-(input/output) cycles, or CPU cycles or a combination of I/O and CPU cycles (with some weighting factor used).

In an alternative implementation, U is expressed as a number of bytes (or some other measure of the amount of data) processed, since the number of bytes processed provides some measure of CPU or I/O cycles. The cost (in terms of bytes) of a query plan is the total size of the input and intermediate result tuples (or rows) that are to be read and written in the query plan. Similarly, at any time, the amount of work that has been performed for the query plan is represented by using the total bytes that have been processed for the query plan so far.

The progress indicator module 32 refines both its estimate of how many Us each segment of a query will take to execute, and the estimate of the conversion factor from U to time. The estimated number of U's required to process a segment changes as the system gathers more statistics about intermediate results as the query runs. The number of U's needed to process a database query depends on factors such as table cardinalities and sizes, and others.

The refinement (at 219) of the estimate of the conversion factor from U to time results from observations of how quickly the system is processing U. Thus, for example, if U were chosen to be CPU cycles, then the conversion factor of U to time can be expressed by the following question: "how many CPU cycles per second are being devoted to this query?" On the other hand, if U were chosen to be a number of bytes, then the conversion factor of U to time can be expressed by the following question: "how long does it take to process each byte?"

Initially (before the query starts running), the progress indicator module 32 estimates (at 208) that executing the query plan will require a number of U's that is based on the optimizer's cost estimates (e.g., number of I/O cycles, table cardinalities and sizes, etc.) for the query plan. Before giving its first estimate of running time, the progress indicator module 32 monitors (at 210) some amount of processing to see how quickly the database system 10 is consuming U.

For each segment of the query plan, the progress indicator module 32 collects (at 216) statistics about table cardinalities and sizes. Based on the updated table cardinalities and sizes, the progress indicator module 32 refines (at 218) the number of U's needed to execute the query plan in the database system 10. The number of U's needed to execute the query plan is converted at (220) by the progress indicator module 32 into a corresponding amount of time. The time to process one U ranges from the time for one physical I/O cycle (if the query plan is disk access intensive) to the time to process one buffer-pool resident page of data (if the data accessed by the query plan is completely cached in memory), or somewhere in between. In heavily loaded systems, the time to process a U can exceed the time to perform a physical I/O cycle. The progress indicator presented by the module 32 is updated (at 222) as the underlying estimates for segments of the query plan are refined. The acts performed at 216-222 are iteratively repeated as the progress indicator module 32 traverses through the multiple segments of the query plan. The progress indicator module 32 starts at the lowest level segments of the query plan and works upwardly to higher level segments. After completion of a particular segment, the costs for the completed segment are exactly known and can be used for calculating costs of higher level segments.

Figure 4:
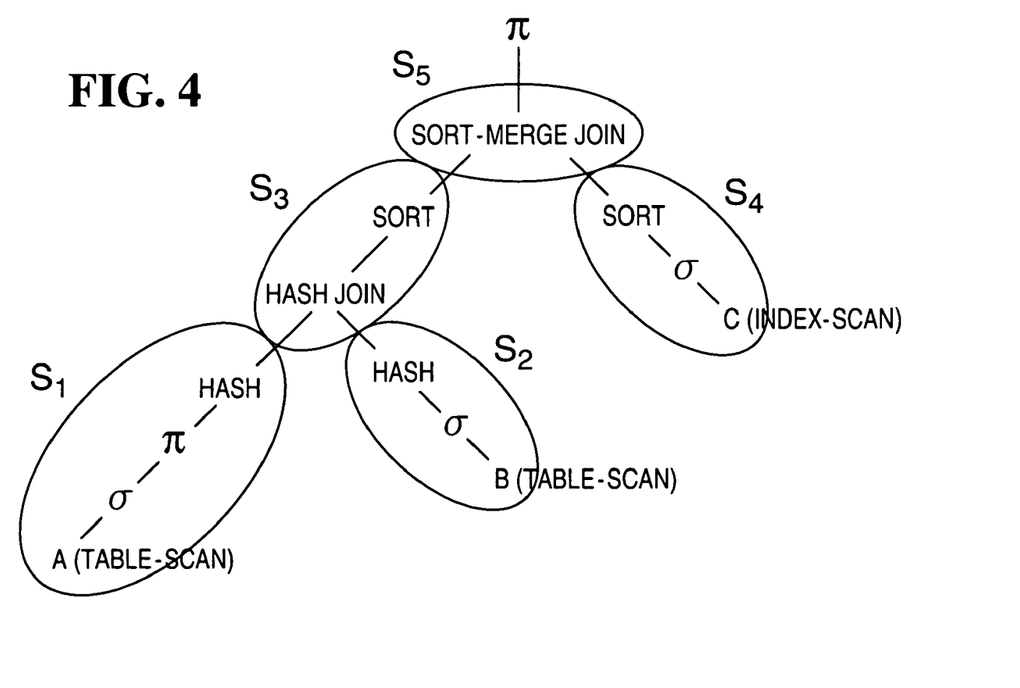
FIG. 4 illustrates an example query plan that is divided into multiple segments by the progress indicator mechanism.

As noted above, a query plan developed by the optimizer 19 for a given query is divided into segments so that the progress indicator module 32 can focus on individual segments rather than the entire query plan. An example of such segmentation is shown in FIG. 4. Each segment (labeled $S_1$, $S_2$, $S_3$, $S_4$, and $S_5$ in FIG. 4) contains one or more consecutive operators that can be executed as a pipeline. A pipeline continues within a segment and breaks at the end of a segment. In practice, blocking operators (e.g., hash-table build operators, sort operators, intermediate result materialization operators, and so forth) serve as natural separation points between different segments. Each segment can be viewed as tree. The root of the tree is the output of the segment, and the leaves of the tree are the inputs of the segment. The segment trees in combination make up a query plan tree. The inputs of a segment either come from base relations or from outputs of lower level segments. In FIG. 4, segments $S_1$ and $S_2$ are considered lower level segments than segment $S_3$, as an example.

In the FIG. 4 example, segment $S_1$ computes $\pi(\sigma(A))$ and hashes the results into multiple partitions $P_A$. The $\pi$ symbol denotes a projection operator, while the $\sigma$ symbol denotes a selection operator. Thus $\pi(\sigma(A))$ denotes selection and projection of base table A into a result set, with the result set hashed into partitions $P_A$. Segment $S_2$ computes $\sigma(B)$ and hashes the results into multiple partitions $P_B$. Segment $S_3$ computes a hash join of input partitions $P_A$ and $P_B$, and sorts the results into multiple sorted runs $R_{AB}$. Segment $S_4$ computes $\sigma(C)$ and sorts the results into multiple sorted runs $R_C$. Segment $S_5$ computes a sort-merge join of inputs $R_{AB}$ and $R_C$ (from segments $S_3$ and $S_4$, respectively) and generates the final query result after projection ($\pi$).

The number of U's required by a query plan is the sum of the number of U's required by all the segments in the query plan. This number is referred to as the "cost of the query." Similarly, the number of U's it takes to execute a segment is referred to as the "cost of the segment."

There are two types of inputs to segments. The first type of segment input is an upper level segment input. An upper level segment input is the output of some other lower level segment. A second type of segment input is a base segment input, which comes from a base table. In the example of FIG. 4, segments $S_1$, $S_2$ and $S_4$ have base segment inputs that come from base tables A, B, and C, respectively. Segments $S_3$, and $S_5$ have upper level segment inputs that receive the outputs of lower level segments.

For an upper level input of a segment S, at the time S starts execution, all the segment(s) that are below S must have finished. Hence, the output cardinalities and sizes of this (these) lower level segment(s) are known exactly, since the output cardinalities and sizes are computed as the lower level segments run. In contrast, a base segment input of a segment is either the result of a table scan or an index scan. At the beginning of a table scan or index scan, the progress indicator module 32 has to use the optimizer's cardinality and size estimates for the cardinality and size of the input, even if this estimate is not precise. Suppose that the optimizer's cardinality estimate (estimate of number of types in base table) for the base segment input is $N_e$, while the precise cardinality is $N_p$. There are two possible cases ((a) and (b) below):

(a) $N_p \leq N_e$ (the value of the precise cardinality $N_p$ is less than or equal to the value of the estimated cardinality $N_e$). In this case, during the table scan or index scan, the progress indicator module 32 continues to use $N_e$ as the estimated segment input cardinality. After finishing the scan, the progress indicator module 32 knows the precise number $N_p$ and uses the precise number $N_p$ as the precise segment input cardinality.

(b) $N_p > N_e$ (the precise cardinality $N_p$ is greater than the estimated cardinality $N_e$). During the table-scan or index-scan, the progress indicator module 32 continues to use $N_e$ as the estimated segment input cardinality, until the actual number of tuples that have been read exceeds $N_e$. From that point on until the finish of the scan, the progress indicator module 32 uses the actual number of tuples read so far as the estimated segment input cardinality.

During the table scan or index scan, the progress indicator module 32 also collects statistics about the average tuple size. The size of the base segment input is the product of its cardinality and its average tuple size. If the estimated segment input cardinality and/or size changes, the progress indicator module 32 refines the estimates related to the current segment, and propagates these changes upward in the query plan tree (the tree of FIG. 4, for example). Estimating the average output tuple size is relatively straightforward. At any time, the progress indicator module 32 uses the average output tuple size computed so far as the estimated average tuple size of the final output. Since the progress indicator module 32 is using bytes processed as U in one implementation, the U required by the current segment is just the product of the estimated cardinalities and average tuple sizes of the current segment's inputs and the output.

During processing, the progress indicator module 32 also collects statistics about cardinalities and average tuple sizes of intermediate results, which can be computed on the fly inexpensively as the intermediate results are being generated. The statistics are collected at the output of each segment. The exception is the last segment in the query plan, for which the output is the final query result that will be returned to the user. Therefore, no statistics are collected at the output of the highest level segment.

A benefit of progress indicator technique according to some embodiments is that statistics about the number of distinct values and histograms of intermediate results do not have to be collected, which reduces processing costs associated with updating the progress indicator. Also, according to some embodiments, the progress indicator module 32 does not have to insert statistics collection operator into the query plan. Rather, the progress indicator module 32 embeds the statistics collection code in the operator code. "Operator code" refers to the software code that performs operations of each segment, such as a selection operation, projection operation, join operation, and so forth. For each operator, the progress indicator module 32 augments the operator's data structure so that the collected statistics can be held in the data structure. For each query plan, the progress indicator module 32 uses a flag to control whether statistics need to be collected. When the progress indicator feature is in use, the flag is turned on and the progress indicator module 32 collects statistics in appropriate operators. By embedding the statistics collection code in the operator code for the segments, more efficient statistics collection can be achieved. However, in other embodiments, statistics collection can be implemented by adding statistics collection operators into the query plan.

To smoothly update the progress indicator, the progress indicator module 32 continually refines the estimates of the segment costs. For segments that have finished execution, the progress indicator module 32 knows the exact costs. Therefore, the progress indicator module 32 focuses on the cost of the segment that is currently being executed and the costs of the future segments that have not started execution.

Each segment contains one or more steps that are executed in a pipeline. The progress indicator module 32 monitors bytes processed at the boundaries of segments, which means that the progress indicator module 32 considers the input(s) to the segment and the output of the segment in computing the cost of a segment. Intuitively, a byte of data coming from a segment input is counted once as the byte is input into the segment. A byte of data produced by a segment is counted once as the byte is output by that segment (except when the segment output is the final output that is displayed to the user), and again as the byte is input by the next segment. Counting the byte of data once at the output of one segment and counting the byte again at the input to the next segment results in double counting of the byte. If the intermediate result is indeed materialized to disk, this "double counting" corresponds to the cost of first writing the byte to disk and then reading it back from the disk. If at run time this intermediate result actually ends up being buffered in memory, this double counting corresponds roughly to the cost of handling the byte first at the output of the lower level segment and then again at the input of the next higher level segment.

A special case arises if an operator at the leaves or root of a segment is a multi-stage operator (for example, a multi-stage partition operator for a hash join, or a multi-stage sort). For such operators, bytes handled by the operator will be counted once each time the bytes are logically read or written.

As a current segment is being processed, the progress indicator module 32 continually refines the estimates for the segment's output cardinality, the segment's average output tuple size, and the total U the segment will consume. The progress indicator module 32 propagates the improved estimates for the current segment upwards in the query plan to the next segment. Then the progress indicator module 32 refines the estimates of the output cardinality, average output tuple size, and the number of U's for the next segment.

The progress indicator module 32 computes the expected number of U's for a future segment by invoking the optimizer's cost estimation module with the improved estimates of output cardinality and output size for the current segment (and the existing estimates for any other inputs to the future segment, if the segment is a multiple-input segment). The estimates for segment input(s) of the future segment are not refined if they are not from the current segment. Because the optimizer gives a number of I/O cycles in its estimate, the progress indicator module 32 can convert number of I/O cycles to bytes simply by multiplying the estimate by a page size (an I/O cycle reads or writes a page to disk).

The progress indicator module 32 continues this propagation of estimates and recalculation of costs until the progress indicator module 32 reaches the highest-level segment of the query plan tree. At that time, the progress indicator module 32 uses the exact costs of the past segments, the improved cost estimate of the current segment, and the improved cost estimates of the future segments, to refine the estimated query cost.

For example, consider the query plan example shown in FIG. 4. Suppose the current segment is $S_2$. The progress indicator module 32 continually uses the improved estimates related to segment $S_2$ to refine the estimates related to future segments $S_3$ and $S_5$. The improved estimates related to segment $S_2$ will not influence the estimates related to segment $S_4$ since the output of the segment $S_2$ is not an input to segment $S_4$. Hence, for segment $S_a$, the progress indicator module 32 uses the original estimates provided by the optimizer.

To estimate the output cardinality of a segment, the concept of dominant inputs is used to enable an approximate indication of how far along the current segment is in processing the segment's inputs. For each segment, one or two dominant inputs are defined. Among all the inputs of a segment, the progress indicator module 32 chooses a dominant input so that once all the tuples at the dominant input have been processed, the entire segment finishes execution. There is an exception: for a segment that contains a sort-merge join operator, two dominant inputs are defined. If a segment contains only one input, this input is defined as the dominant input.

However, if a segment contains multiple inputs, then the segment contains at least one join operator. If a segment contains multiple join operators, the progress indicator module 32 finds the join operator at the lowest level of the segment. There are several possible cases for the join operator in the segment:

(a) if the join operator is a nested loops join operator, the progress indicator module 32 defines the dominant input to be the input of the segment that is a left descendant of the nested loops join operator (the outer relation);

(b) if the join operator is a hash join operator, the progress indicator module 32 defines the dominant input to be the input of the segment that is a right descendant of the hash join operator (the probe relation);

(c) if the join operator is a sort-merge join operator, the progress indicator module 32 defines the dominant inputs to be the two inputs of the segment that are descendants of the sort-merge join operator.

As an example, consider the query plan example shown in FIG. 4. The dominant inputs of the segments are listed as follows:

Segment $S_1$: A.
Segment $S_2$: B.
Segment $S_3$: $P_B$.
Segment $S_4$: C.
Segment $S_5$: $R_{AB}$ and $R_C$.

The following explains how to use the percentage of the dominant input that has been processed so far to refine the estimated output cardinality. A first case involves a current segment containing one dominant input. A second case involves the current segment containing two dominant inputs.

At the time that the current segment starts execution, an initial estimate $E_1$ of the current segment's output cardinality is provided. $E_1$ is computed using the input cardinalities of the current segment and the optimizer's cost estimation module. This estimate may not be inaccurate—the goal is to detect this while the segment is running, and gradually replace this estimate with an estimate that approaches the true output cardinality as the execution of the segment nears completion.

Suppose that the dominant input cardinality of the current segment is z. Assume that so far, the progress indicator module 32 has processed x of the z tuples and generated y output tuples. Then the percentage that the dominant input has been processed is p=x/z. If it is assumed that at any time, the number of output tuples that have been generated is proportional to the percentage that the dominant input has been processed, then the progress indicator module 32 can estimate the final output cardinality of the current segment to be $E_2$=y/p=yz/x. In practice, this assumption may not be valid and so the progress indicator module 32 also considers the initial estimate $E_1$.

At any time, the progress indicator module 32 uses the following heuristic formula to estimate the final output cardinality E of the current segment:

$$E = p \times E_2 + (1-p) \times E_1.$$

This heuristic formula is provided to smooth fluctuations in the estimate and to allow the estimate to gradually change from the initial estimate (when the current segment just started execution) to the actual segment output cardinality (when the current segment finishes execution).

Recall that a segment containing a sort-merge join operator has two dominant inputs. In this case, once the progress indicator module 32 reaches the end of either dominant input, the sort-merge join (and thus the segment) immediately finishes execution. Therefore, the dominant input that is being scanned relatively faster is used to decide the percentage p that the two dominant inputs have been processed.

The following example illustrates the procedure. Consider a sort-merge join operator with two input relations A and B. It is assumed that both A and B have already been sorted. Suppose that the cardinality of A is |A|, and the cardinality of B is |B|. Suppose that the progress indicator module 32 has processed x tuples from A and y tuples from B. Let $q_A$=x/|A| and $q_B$=y/|B|. Then the following formula is used to decide p:

$$P = \max(q_A, q_B).$$

Effectively, the equation above selects the percentage p to be the larger of the percentages of base tables A and B that have been processed.

As noted above, the progress indicator depends on two factors: the estimates of U, and the estimated conversion factor between U and time. The conversion of U to time reflects what the progress indicator module is observing as the system is running. So, at all times, the progress indicator module 32 keeps track of the amount of work (measured in U's) that has been done for query Q in the last T seconds, where T is a pre-defined number. The average speed that the work has been done for query Q in the last T seconds is used as the estimated current execution speed of query Q. To minimize the influence of temporary fluctuations, T is defined not to be too small. However, T is also defined not to be too large; otherwise the calculated execution speed will not closely reflect the actual current execution speed. In one example implementation, the value of T is chosen to be 10 seconds.

This approach to calculating the conversion from U to time is relatively simple. There are several cases where this approach may not provide accurate results. One situation in which this approach may not produce accurate results is when the system load fluctuates substantially. At times of high load, the progress indicator module 32 will overestimate the execution time, since the progress indicator module 32 will think that each U takes a relatively long time to process. At times of light load, the progress indicator module 32 will underestimate the execution time for similar reasons. One possible improvement to the approach above would be to incorporate some history beyond T to "smooth" the estimates (such as by computing a decaying average, so that while the most recent execution speed has the major impact, the overall execution speed also has an impact).

The second situation in which the conversion from U to time may be inaccurate is when segments have radically different characteristics. In particular, a problem arises when one segment can be expected to process U much more quickly than another. For example, consider a two-segment plan, in which segment $S_1$ feeds segment $S_2$. If $S_1$ processes U more slowly than $S_2$ (perhaps $S_1$ is I/O-intensive whereas $S_2$ has a high buffer pool hit rate), then while $S_1$ runs the progress indicator module 32 will overestimate the time it will take to run $S_2$. To alleviate this issue, the conversion from U to time can take into account both the expected processing speed for the segments and the current system load.

Instructions of the various software routines or modules discussed herein (such as the progress indicator module 32, parsing engine 16, data server modules 12, and so forth) are executed on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:
1. A method for use in a database system, comprising:
processing a Structured Query Language (SQL) database query in the database system;
initially setting an estimate for a first cost factor to represent a cost of processing the database query;

during processing of the database query, updating the estimate of the first cost factor;
converting the updated estimate of the first cost factor to a time amount using a conversion factor between the first cost factor and time;
during processing of the database query, updating the conversion factor to reflect changes in a rate at which the database query is being processed by the database system;
outputting a progress indicator that indicates progress of the processing of the database query, wherein the progress indicator is based on the time amount; and
defining the first cost factor as being a number of units of work to process the database query.

2. The method of claim 1, further comprising defining each unit of work as being a predefined amount of data.

3. The method of claim 1, wherein updating the estimate of the first cost factor is based on updated table cardinalities during processing of the database query.

4. The method of claim 1, wherein outputting the progress indicator comprises outputting a graphical representation of an amount of work that has been performed and an amount of work yet to be performed for the database query.

5. The method of claim 4, wherein outputting the progress indicator comprises outputting an indicator of time left to process the database query.

6. The method of claim 1, further comprising:
in response to the database query, an optimizer selecting a query plan;
wherein outputting the progress indicator comprises outputting the progress indicator for the query plan.

7. The method of claim 6, further comprising:
dividing the query plan into a plurality of segments, each segment corresponding to a respective set of one or more operations of the query plan; and
updating the first cost factor as each segment is processed.

8. The method of claim 7, further comprising propagating an updated first cost factor of a first segment to a second segment of the query plan.

9. The method of claim 7, wherein a first segment has one input, the method further comprising:
computing a cardinality of an output of the first segment based at least in part on a percentage of tuples processed at the input of the first segment.

10. The method of claim 9, further comprising:
setting an initial cardinality estimate for an input cardinality of the input of the first segment;
determining an actual cardinality of the input of the first segment;
in response to the actual cardinality being less than or equal to the initial cardinality estimate, using the initial cardinality estimate as the input cardinality to calculate the first cost factor.

11. The method of claim 10, further comprising:
in response to the actual cardinality being greater than the initial cardinality estimate, updating a value of the input cardinality once a number of input tuples processed is greater than the initial cardinality estimate; and
calculating the first cost factor based on the updated value of the input cardinality.

12. The method of claim 7, wherein a first segment has at least a first input and a second input, the method further comprising:
calculating a cardinality of an output of the first segment based on a percentage of tuples processed at a dominant one of the first and second inputs.

13. An article comprising at least one computer-readable storage medium containing instructions that when executed cause at least one processor in a database system to:
process a Structured Query Language (SQL) database query;
estimate a number of units of work to process the database query;
convert the number of units of work to a time amount using a conversion factor between units of work and time;
during processing of the database query, update the conversion factor to reflect a changing rate at which the database query is processed by the database system, wherein converting the number of units of work to the time amount uses the updated conversion factor; and
output a progress indicator that is based on the time amount, wherein the progress indicator represents progress of the processing of the database query.

14. The article of claim 13, wherein the instructions when executed cause the at least one processor in the database system to further:
initially estimate the number of units of work based on estimates of table size;
update the estimates of table size during processing of the database query; and
update the number of units of work based on the updated estimates of table size.

15. The article of claim 13, wherein outputting the progress indicator comprises outputting an indicator representing an amount of work processed and an amount of work yet to be processed for the database query.

16. The article of claim 13, wherein the instructions when executed cause the at least one processor in the database system to further:
in response to the database query, select a query plan;
wherein outputting the progress indicator comprises outputting the progress indicator for the query plan.

17. A database system, comprising:
a storage to store tables;
one or more processors to:
process a Structured Query Language (SQL) database query that refers to the tables;
estimate a number of units of work to process the database query;
convert the number of units of work to a time amount using a conversion factor between units of work and time;
during processing of the database query, update the conversion factor to reflect a changing rate at which the database query is processed by the database system, wherein converting the number of units of work to the time amount uses the updated conversion factor; and
output a progress indicator that is based on the time amount, wherein the progress indicator represents progress of the processing of the database query.

18. The database system of claim 17, the one or more processors to further:
in response to the database query, select a query plan;
output the progress indicator for the query plan.

19. The database system of claim 18, the one or more processors to further:
divide the query plan into a plurality of segments, each segment corresponding to a respective set of one or more operations of the query plan; and
update the number of units of work as each segment is processed.

20. The database system of claim 19, wherein the number of units of work is based on cardinalities of the tables.

21. The database system of claim 20, the one or more processors to further:
   initially determine the number of units of work based on estimated cardinalities of the tables.

22. The database system of claim 21, further comprising an optimizer, wherein the estimated cardinalities of the tables are provided by the optimizer.

23. The database system of claim 22, the one or more processors to further:
   update the cardinalities of the tables during processing of the database query; and
   update the number of units of work based on the updated cardinalities of the tables.

24. The article of claim 13, wherein outputting the progress indicator comprises displaying the progress indicator.

25. The article of claim 24, wherein displaying the progress indicator comprises displaying an amount of time that has elapsed and an amount of time left in processing the database query.

\* \* \* \* \*